Nov. 12, 1935.   C. L. MADDEN ET AL   2,020,424
RAILWAY WHEEL
Filed Nov. 26, 1934
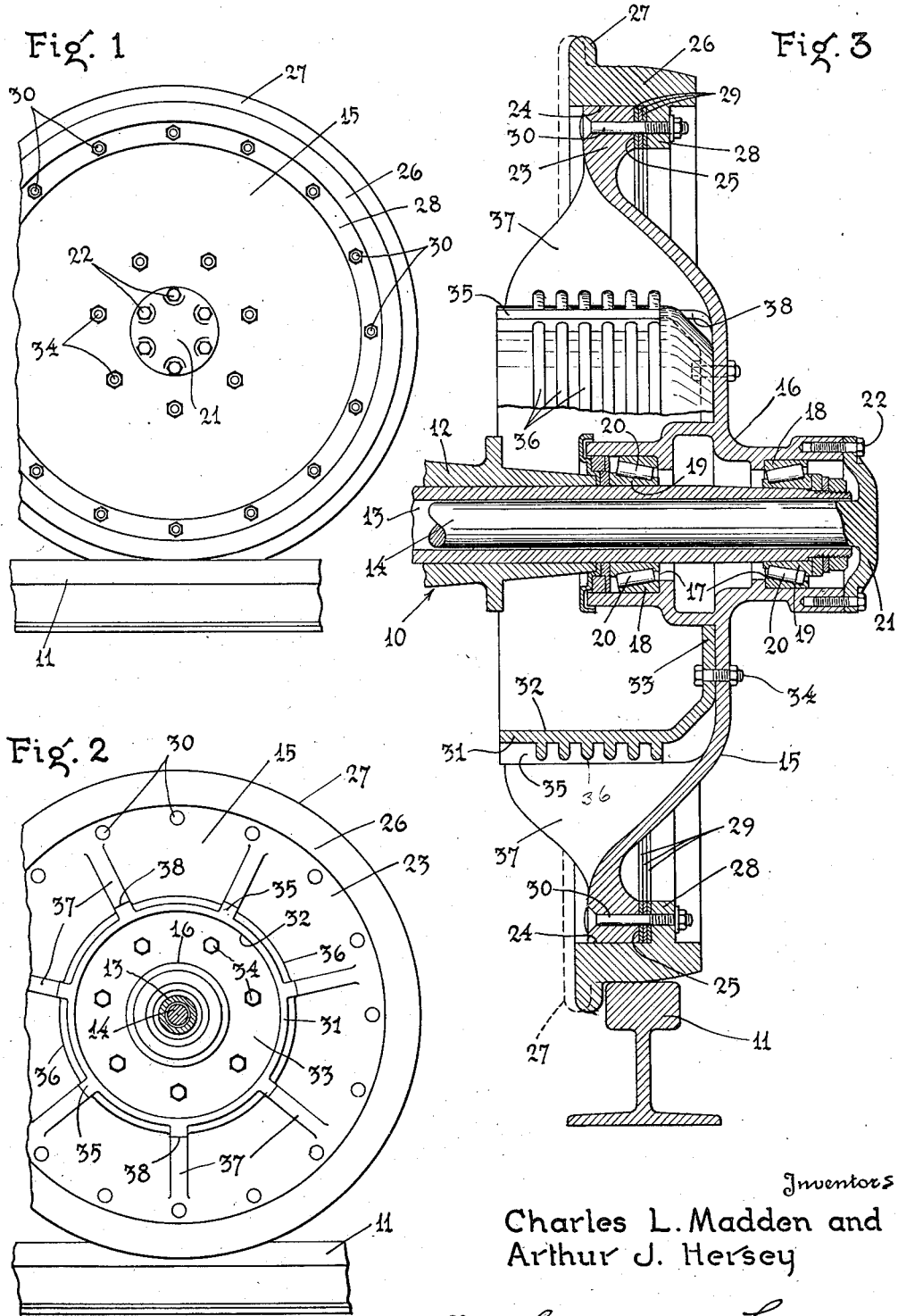
Inventors
Charles L. Madden and
Arthur J. Hersey Patented Nov. 12, 1935

2,020,424

UNITED STATES PATENT OFFICE 2,020,424

RAILWAY WHEEL

Charles L. Madden and Arthur J. Hersey, Minneapolis, Minn.

Application November 26, 1934, Serial No. 754,771

8 Claims. (Cl. 295—1)

Our invention relates to improvements in railway wheels.

With the increasing desirability of adapting standard automotive highway truck equipment to railway tracks, an urgent need has arisen for a practical and economical wheel construction for such purposes.

An object of our invention is to provide an improved wheel construction adapted to be employed in converting automotive truck equipment to use on railways.

More specifically it is an object of our invention to provide a durable and practical railway wheel made up of separate elements including a web, flanged rim and brake drum, whereby each element may be constructed economically and from material best suited to its particular purpose.

A feature of the invention resides in dishing the web of the wheel outwardly, whereby the rim of the flanged wheel may properly engage the rail of a railway track of standard gauge with the hub of the wheel applied in the usual manner to the relative long axle of the conventional automotive truck equipment.

Another feature of the invention resides in compactly incorporating the brake drum in the wheel structure and in providing means associated with the web and the drum through which said web and drum lend support to each other and also through which heat generated in the wheel is effectively dissipated.

A further feature of the invention consists in the ready demountability of the rim and in the convenient adjustment thereof axially of the wheel to provide various flange clearances for the different kinds of railway service.

With the foregoing and other objects in view, which will appear in the following description, the invention resides in the novel combination and arrangement of parts and in the details of construction hereinafter described and claimed.

In the drawing, Fig. 1 is a fragmentary elevational view of the outer side of a railway wheel embodying our invention; Fig. 2 is a similar view of the inner side of said wheel, and Fig. 3 is a vertical central sectional view thereof.

In the illustrated embodiment of our invention, the wheel is shown as being mounted on a conventional automotive axle 10 and as riding upon a rail designated by the numeral 11. The axle 10 for a normal wheel tread of approximately seventy-six inches, as compared with the standard railway tread of approximately fifty-six inches, includes the usual housing 12, bearing sleeve 13 and axle shaft 14 with coupling head 21.

The wheel includes a deeply outwardly dished web 15 which is shown as being formed integrally with a hub 16 of conventional design, but which may, if desired, be removably attached to such a hub in any suitable manner. Spaced bearings 17 consisting of bearing races 18, 19 applied to the hub 16 and bearing sleeve 13 cooperate with roller bearings 20 of conventional form, said hub being connected with the web 15 between said bearings 17. The head of the axle shaft 14 is secured to the outer end of the hub 16 by means of cap screws 22.

The web 15 is formed with a peripheral rim 23 having an external cylindrical surface 24 and an outer marginal seat 25. A demountable tire 26 slips over the cylindrical surface 24 of said rim 23 from the outer side of the wheel, said tire having an external rail flange 27 at its inner edge and an internal annular attaching flange 28 near its outer edge. Between the marginal seat 25 of the web and said attaching flange 28 of the tire are a number of shim rings 29, the inner ring bearing against the marginal seat 25 of the rim 23 and the outer ring bearing against the inner face of said flange 28. Attaching bolts 30 extending through bores in the rim 23, shim rings 29 and attaching flange 28 secure the tire 26 to the web 15. These bolts 30 together with the rings 29, which may be employed in different numbers as may be desired, serve to vary the axial relation between the web 15 and tire 26, whereby the clearance between the flange 27 and a rail may be altered to suit the particular service to which the wheel is to be put.

Disposed within the concavity of the web 15 is a brake drum 31 having an internal friction surface 32, said brake drum having a head 33 formed with a central opening therein snugly receiving the hub 16. Bolts 34 extending through bores in the head 33 of the brake drum and through bores in the web 15 secure said drum to said web. Formed externally of the drum 31 and extending in an axial direction with respect thereto are elongated abutments 35 and between these abutments are spaced cooling ribs 36 extending circumferentially of the drum. The web 15 is formed with cooling elements which consist of radial fins 37 having shoulders 38 extending in an axial direction relative to the wheel. These shoulders 38 correspond with and bear against the abutments 35 on the drum 31, a press fit between said shoulders and abutments being desirable. In addition to their function in dissipating heat in the wheel, the radial fins 37 have a further and very important function in serving as reinforcing braces between the drum 31 and web 15, whereby the drum lends support to the dished web and said web, in turn, lends support to the drum.

In a wheel constructed as above described, the drum 31, web 15 and tire 26 may be made of materials particularly suited thereto. The web 15 may be deeply dished outwardly to conform with wide variations between the axle length and rail tread and, at the same time, the outwardly dished web and brake drum may be of relatively light construction owing to the reinforcement that each affords to the other through the fins 37. Said fins not only cooperate in such reinforcement of said parts, but also serve effectively in dissipating the heat generated in the wheel. The tire 26 is readily demountable from the rim of the wheel for repair or replacement and is readily adjustable axially of the wheel to vary the rail flange clearance as may be desired.

Changes in the specific form of our invention, as herein disclosed, may be made within the scope of what is claimed without departing from the spirit of our invention.

Having described our invention, what we claim as new and desire to protect by Letters Patent is:

1. In a railway wheel, a web having a tire thereon and a hub portion at the inner side thereof, said web being dished outwardly to cup said hub portion and the end of an axle support of relatively great length as compared with the wheel tread, and means at the concave side of said wheel serving to reinforce the same and constituting braking and heat dissipating means for said wheel, said means including a drum encircling said hub portion and axle support and spaced therefrom to accommodate braking mechanism between the same and the inner surface of said drum, said means further including radial fins issuing from an outer zone of said web and having shoulders overreaching said drum in substantially the direction of the axis of the wheel, said shoulders facing and engaging the outer surface of the drum about the periphery thereof.

2. A railway wheel having a web dished outwardly to cup the end of an axle support, and means at the concave side of said wheel serving to reinforce the same and constituting braking and heat dissipating means, said means including a drum encircling said axle support and spaced therefrom to accommodate braking mechanism between said support and the inner surface of said drum, said means further including spaced radial braces issuing from said web and engaging said drum lengthwise thereof at intervals about its outer periphery.

3. A railway wheel having an outwardly dished web and a hub portion at the inner side thereof cupped by said web, and means at the concave side of the wheel serving to reinforce the same and constituting braking and heat dissipating means for said wheel, said means including a drum encircling said hub portion and spaced therefrom to accommodate braking mechanism between the same and the inner surface of said drum, said means further including radial braces issuing from an outer zone of said web and having shoulders overreaching said drum in substantially the direction of the axis of the wheel, said shoulders facing and engaging the drum exteriorly thereof about its periphery.

4. A railway wheel having a web dished outwardly to accommodate an axle of relatively great length as compared with the wheel tread, a brake drum formed independently of the web and cupped within the concavity of said web, said drum being adapted to contain braking mechanism therein, means cooperating with the web and drum through which the drum reinforces the dished web against load stresses and the web reinforces the drum against outward braking stresses from within, said means serving also to dissipate heat generated in the wheel and comprising spaced radial fins formed integrally with and issuing from the web at an outer zone thereof, said drum having spaced elongated abutments traversing its outer periphery, said fins having shoulders coextensive with and adapted to bear against said abutments, said drum having fins circumferentially thereof extending from one abutment to the next abutment thereon.

5. A railway wheel having a web dished outwardly to accommodate an axle of relatively great length as compared with the wheel tread, a brake drum formed independently of the web and cupped within the concavity of said web, said drum being adapted to contain braking mechanism therein, means cooperating with the web and drum through which the drum reinforces the dished web against load stresses and the web reinforces the drum against outward braking stresses from within, said means serving also to dissipate heat generated in the wheel and comprising spaced radial fins formed integrally with and issuing from the web at an outer zone thereof, said drum having spaced elongated abutments traversing its outer periphery, said fins having shoulders coextensive with and adapted to bear against said abutments.

6. A railway wheel having a web dished outwardly to accommodate an axle of relatively great length as compared with the wheel tread, a brake drum constructed independently of the web and cupped within the concavity of said web, said drum being adapted to contain braking mechanism therein and being connected at its inner end to said web at the central zone thereof, means cooperating with the web and drum through which the drum reinforces the dished web against load stresses and the web reinforces the drum against outwardly braking stresses from within, said means serving also to dissipate heat generated in the wheel and comprising spaced radial fins integral with the web and issuing therefrom at an outer zone thereof, said fins engaging the drum at intervals, in the direction of its length, about the outer periphery of said drum.

7. A railway wheel having a web dished outwardly to accommodate an axle of relatively great length as compared with the wheel tread, a brake drum cupped within the concavity of said web and adapted to contain braking mechanism therein, means cooperating with the web and drum through which the drum reinforces the dished web against load stresses and the web reinforces the drum against outward braking stresses from within, said means serving also to dissipate heat generated in the wheel and comprising spaced radial braces issuing from the web at an outer zone thereof, and engaging the drum, at intervals about the outer periphery thereof, along lines extending generally in the direction of the length of said drum.

8. A railway wheel having a web formed with a hub portion at the inner side thereof, said web being dished outwardly to cup said hub portion and the end of an axle support of relatively great length as compared with the wheel tread, and means at the concave side of said wheel serving to reinforce the same, said means including an annulus encircling said hub portion and axle support and interiorly spaced therefrom and further including radial braces issuing from an outer zone of said web and overreaching said annulus in substantially the direction of the axis of the wheel, said braces engaging said annulus exteriorly thereof about its periphery.

CHARLES L. MADDEN.
ARTHUR J. HERSEY.